3,057,894
PRODUCTION OF ORGANOMETALLIC
COMPOUNDS
Gene C. Robinson, Baton Rouge, La., assignor to Ethyl Corporation, New York, N.Y., a corporation of Delaware
No Drawing. Filed Jan. 5, 1959, Ser. No. 784,890
6 Claims. (Cl. 260—429.7)

This invention is concerned with the preparation of organometallic compounds, particularly those of the polyvalent metals.

Although it has been known for many years to prepare organometallic compounds, the preparation of such materials from the metal element itself has been employed only to a limited extent. The principal reaction known at present for preparing organometallic compounds from the metal is the reaction of the metal with an organic halide. For example, organomagnesium, aluminum, tin, sodium and the like compounds have been so produced. These processes have not been applied to an appreciable extent in commercial operation because of certain inherent disadvantages. In particular, low yields are obtained, generally half of the metal is consumed in forming as a by-product the principal metal halide, specific solvents or catalysts are required in most instances and in the preparation of the organometallic compounds of the polyvalent metals the product produced is an organometal halide. Only in a few instances can such metals be converted to a fully organo substituted metal compound. By way of illustration, when sodium is reacted with an organic halide by the known techniques half of the sodium results in the sodium halide by-product. Likewise, the well known reaction of zinc metal with organic halides produces the organozinc halide which must be further treated to result in the fully alkylated zinc compound. A somewhat analogous situation is exhibited in the case of the metals aluminum, tin, antimony and the like.

Accordingly, it is desirable to provide an improved technique for the formation of various organometallic compounds which avoids the above and other disadvantages of the prior art techniques. Therefore, an object of this invention is to provide a more efficient and effective method for the production of organometallic compounds. Another object is to produce organometallic compounds in higher yield and purity than produced heretofore from the metal. A more specific object is to provide a more efficient and economical process for the production of organometallic compounds of the polyvalent metals. These and other objects of the invention will be evident as the discussion proceeds.

The above and other objects of this invention are accomplished by the reaction of a polyvalent metal having an atomic number less than 82 with an organic ester of an inorganic acid, and a bimetallic organometallic compound wherein one metal is selected from the group consisting of group I-A and II-A metals and the other metal is selected from a group II-B or III-A metal. The bimetallic compound in which one metal is a group I-A metal, especially sodium, and the other metal is a group III-A metal, especially aluminum, and the organo portion is alkyl having up to about 6 carbon atoms are preferred because of their greater availability and reactivity. The metals employed in the reaction are preferably the polyvalent metals, especially those of groups II-A, II-B, III-A, IV-A and V-A having an atomic number of less than 82. It is to be understood that included in such description of metals are also the metals and metalloids as, for example, boron, silicon and arsenic. Among the organic esters, the organic halides, especially alkyl halides, are preferred. The reaction is preferably conducted at 25 to 150° C. Thus, one embodiment of this invention comprises the reaction of a bimetallic organometallic compound wherein one metal is a group I-A metal and the other metal is a group III-A metal and the organo radicals are alkyl radicals having up to and including about 6 carbon atoms with a polyvalent metal having an atomic number less than 82, and an alkyl halide. An especially preferred embodiment comprises that wherein the metal employed is tin, antimony, aluminum, zinc or magnesium. When the metal employed is different from the group II-B or III-A metal of the bimetallic organometallic compound, a by-product which is also coproduced is an organometallic compound of the group II-B or III-A metal. For example, in the reaction of sodium tetraethylaluminum with tin and ethyl chloride, aluminum triethyl is also coproduced in conjunction with tetraethyltin.

The process of this invention results in the formation of organometallic compounds directly from the metallic element in greater yield than heretofore available when employing an organic halide for reaction therewith and without consuming half of the metal in the formation of a by-product metal salt. Thus, essentially 100 percent conversion of the metal to the organometallic compound is theoretically possible in contrast to the prior art processes permitting only 50 percent conversion. Therefore, the metal is used to the fullest in realizing the desired result. Likewise when a by-product additional organometallic compound is coproduced, it is readily recoverable and can be reused in forming the complex bimetallic compound or for other uses. A further advantage of the process is that a fully alkylated organometallic compound is readily obtained from the metal without the use of specific solvents or catalysts and the economical organic halides, namely the chlorides, can be readily employed. Other advantages of the process of this invention will be evident as the discussion proceeds.

In general any bimetallic organometallic compound can be employed. The most suitable of such compounds are those wherein one metal is selected from the group consisting of group I-A and II-A metals and the other metal is selected from the group consisting of group II-B and III-A metals. The bimetallic organometallic compound must in general have at least one carbon to metal bond and the other valences can be satisfied with organic radicals and other ligands which are essentially inert in the reaction. Such preferred materials may be depicted by the following formula $$M(M'Y_aY'_b)_c$$

wherein M is a group I-A or II-A metal, M' is preferably a group II-B or III-A metal or metalloid, Y is an organic radical, preferably hydrocarbon, having up to and including about 18 carbon atoms, Y' is a ligand including electron donating ligands as, for example, the halogens, organic radicals, preferably hydrocarbon having up to and including 18 carbon atoms, alcohol residues having up to and including about 18 carbon atoms, hydrogen, and the like, and "a" is a small whole number from 1 to 4 inclusive, "b" can be 0 to 3 inclusive and "c" is equivalent to the valence of M. Typical examples of such compounds include sodium tetraethylaluminum, sodium tetraoctylaluminum, sodium tetraoctadecylaluminum, sodium tetraethylenylaluminum, sodium tetracyclohexylaluminum, sodium tetraphenylaluminum, sodium tetrabenzylaluminum, sodium tetranaphthylaluminum, sodium triethylaluminum hydride, sodium diethylaluminum dihydride, sodium ethylaluminum triethoxide, sodium diethylaluminum diethoxide, sodium triethylaluminum chloride, sodium diethylaluminum dichloride, sodium triethylzinc, sodium trioctylzinc, sodium diethylzinc hydride, sodium diethylzinc chloride, sodium diethylzinc iodide, and similar such compounds wherein lithium, potassium, rubidium, cesium, beryllium, magnesium, calcium strontium, or barium are substituted for sodium; and boron, gallium, indium, thallium, cadmium and mercury are substituted for aluminum. The fully alkylated compounds are particularly preferred as are such compounds wherein M is sodium and M' is boron or aluminum. The fully alkylated bimetallic compounds in which the organic radicals are hydrocarbon alkyl radicals having up to about 6 carbon atoms are especially preferred, particularly those wherein M is sodium and M' is aluminum or boron because of their greater availability, higher reactivity and superior physical characteristics which contribute toward ease of handling, greater yields and liquid phase reaction systems.

The organic esters of inorganic acids are compounds which are capable of contributing an organic radical wherein a carbon atom will bond to the metal. In this sense, they can also be termed hydrocarbylating agents. It is to be understood that this terminology embodies not only the formation of alkylmetal compounds, but also aryl, cycloalkyl, and the like and, in general, both aliphatic and aromatic metal compounds. Such materials can be depicted by the formula

wherein at least one of said R's is an organic radical, preferably hydrocarbon alkyl, and the other can be the aforementioned organic radicals or hydrogen, Z is an anion which is bonded with the aforementioned R groups, and "$a$" is a small whole number from 1 to 2 inclusive. The preferred Z groups comprise the sulfate, phosphate and halogen anions derived from the corresponding inorganic acids. Included among such materials are, for example, ethyl chloride; ethyl bromide; ethyl iodide; butyl chloride, bromide and iodide; octyl chloride, bromide and iodide; decyl chloride, bromide and iodide; octadecyl chloride, bromide and iodide; vinyl chloride; cyclohexyl chloride; phenyl chloride; ethynyl chloride; benzyl chloride; naphthyl chloride; and the like and similar such compounds wherein the anion is the phosphate or sulfate anion as, for example, diethyl sulfate, ethyl ethane sulfonate, sodium ethyl sulfate, ethyl p-toluene sulfonate, dioctyl sulfate, triethyl phosphate, trioctadecyl phosphate and the like. The alkylating and arylating agents are preferred esters or hydrocarbylating agents. The alkylating agents which are organic halides, particularly the hydrocarbon halides having up to about 18 carbon atoms, are especially preferred because of their greater availability and reactivity. In an especially preferred embodiment, the alkyl chlorides having up to and including 8 carbon atoms are generally employed because of the higher yields obtained and their more practical application.

The metal which is employed is, in general, of a polyvalent metal which is capable of forming a stable organometallic compound and has an atomic number less than 82. Included among such metals are also intended the metalloids. For example, the metals and metalloids beryllium, magnesium, calcium, mercury, boron, aluminum, gallium, silicon, tin, arsenic, and antimony can be employed. The polyvalent metals, particularly those of groups II–A, II–B, III–A, IV–A, and V–A, having an atomic number of less than 82, are preferred. In general, such metals will be solid under the reaction conditions. Accordingly, it is preferable that they be employed in a finely divided state, e.g., below about ⅛ inch major diameter and preferably less than about 1000 microns in diameter. The metals can be obtained in such form, either by mechanical methods or chemical methods. For example, mechanical methods involving grinding or shaving the metal generally under an inert atmosphere are applicable as well as chemical methods wherein the metal is produced in finely divided form such as its reduction from its ore. Metal which is produced as a by-product of other chemical processes is also well suited in the process. Alloys of the metals can be employed particularly when the alloying metal is not capable of forming stable organometallic compounds. Other methods for obtaining the finely divided metal will be evident.

The process of this invention is illustrated by the following typical examples.

*Example I*

To an autoclave equipped with external heating means, internal agitation, and a means for maintaining an inert atmosphere is added 10 parts of finely divided tin of particle size less than 1/16 inch and 15 parts of sodium tetraethylaluminum dissolved in 50 parts of toluene are added thereto. The reaction mixture is heated to between 50 to 60° C. and 15 parts of ethyl chloride added. The temperature is maintained for a period of 1½ hours. At the end of this time, the reaction mixture is cooled to room temperature and filtered to remove by-product sodium chloride. The filtrate is subjected to fractional distillation at reduced pressure to remove the toluene and then the triethylaluminum by-product leaving tetraethyltin as residual liquid. Tetraethyltin and triethylaluminum are produced in high yield.

*Example II*

Employing the procedure of Example I, 10 parts of finely divided zinc are reacted with 70 parts of sodium tetraethylaluminum and 30 parts of ethyl chloride at 75° C. and autogenous pressure employing 30 parts of xylene as a reaction medium. Maintaining these conditions for 2 hours diethylzinc and aluminum triethyl are coproduced in high yield.

*Example III*

Example I is repeated with exception that 50 parts of finely divided magnesium, 30.9 parts of sodium tetraethylboron and 16 parts of ethyl chloride are reacted simultaneously at 115° C. for 1 hour employing the dimethyl ether of diethylene glycol as a reaction diluent. At the end of the reaction period the mixture is filtered to remove insoluble by-product sodium chloride and then subjected to fractional distillation at reduced pressure to separate triethylborane from diethylmagnesium and solvent in high yield.

*Example IV*

Employing the procedure of Example I, 3 parts of magnesium are reacted with 40 parts of lithium tetraethylzinc ($Li_2ZnEt_4$) and 24 parts of ethylbromide in pyridine at 85° C. for 2 hours. The reaction mixture is filtered to remove the by-product lithium bromide and the residue is subjected to fractional distillation to recover diethyl magnesium and diethylzinc by-product from the solvent.

*Example V*

When 15 parts of finely divided antimony are reacted with 100 parts of lithium tetraphenylaluminum and 61 parts of phenyl iodide at 110° C. employing mixed hexanes as a diluent at autogenous pressure for 4 hours, triphenylantimony and triphenylaluminum are coproduced in high yield which are recovered after filtration.

*Example VI*

When 5 parts of finely divided aluminum are reacted with 10 parts of magnesium tetraethylaluminum $$[Mg(AlEt_4)_2]$$

and 15 parts of ethyl iodide at 90° C. and autogenous pressure suspended in mixed nonanes for 3 hours, the reaction mixture is filtered to remove magnesium iodide leaving aluminum triethyl suspended in mixed nonanes.

*Example VII*

Employing the procedure of Example I, finely divided manganese is reacted with sodium tetracyclopentadienyl aluminum and cyclopentadienyl bromide in the diethyl ether of diethylene glycol at 150° C. for 1 hour. Dicyclopentadienylmanganese and tricyclopentadienylaluminum are recovered in high yield from the sodium bromide by-product.

*Example VIII*

Example I is repeated with exception that sodium triethylaluminum hydride is substituted for the sodium tetraethylaluminum. Tetraethyltin and triethylaluminum are produced in high yield.

*Example IX*

When finely divided calcium is reacted with sodium trioctylaluminum bromide and octylbromide in mixed octanes at 50° C. for 4 hours, dioctyl calcium and trioctylaluminum are coproduced.

*Example X*

Dibenzylberyllium and tribenzylaluminum are coproduced when finely divided beryllium metal is reacted with potassium tetrabenzylaluminum and benzylbromide in dimethylaniline at 100° C. for 3 hours.

*Example XI*

Example I is repeated essentially as described with exception that sodium diethylaluminum diethoxide is substituted for sodium tetraethylaluminum; tetraethyltin and ethylaluminum diethoxide are coproduced.

*Example XII*

When Example I is repeated employing diethylsulfate in place of ethyl chloride with the reaction temperature at 90° C. for 3 hours, tetraethyltin and triethylaluminum are obtained.

*Example XIII*

Example XII is repeated with exception that triethyl phosphate is substituted for the diethylsulfate to produce similar results.

*Example XIV*

Employing the procedure of Example I, 10 parts of finely divided silicon are reacted with 20 parts of sodium tetracyclohexylaluminum and 20 parts of cyclohexyliodide. Tetracyclohexylsilane and tricyclohexylaluminum are coproduced.

It is not necessary that the organo groups of the bimetallic organometallic compound be identical to those of the ester. The following example will illustrate this embodiment of the invention.

*Example XV*

Example I is repeated with exception that methyl chloride is substituted for ethyl chloride. Upon completion of the reaction, mixed ethyl methyl tin compounds and triethylaluminum are coproduced.

The above examples are presented by way of illustration and it is not intended to in any way limit the invention thereto. It will be evident that one may substitute other bimetallic oganometallic compounds, metals, and esters described hereinbefore in order to obtain similar results.

In general, the reaction conducted according to the process of this invention is self-sustaining and can be initiated at temperatures as low as about −20° C. and as high as about 200° C. and higher depending upon the decomposition temperature of the products. It is preferable to employ a temperature between about 25° to 150° C. to avoid side reaction and excessive decomposition of the products. If desired, thermal stabilizers can be employed when higher temperatures are used as, for example, naphthalene, styrene, anthracene and the like. Although the process will proceed at subatmospheric, atmospheric and superatmospheric, it is generally desirable to maintain some pressure in the system when highly volatile alkylating agents are employed such as methyl chloride and ethyl chloride. For this purpose, autogenous pressure can be employed. Generally pressures above 1000 p.s.i. are not required and pressures between 20 to 100 p.s.i. are preferred.

The reaction time employed can likewise be varied over a considerable range. Generally not more than about 20 hours' reaction time is required and less than 6 hours is desirable to avoid excessive exposure of the product at the higher temperatures which will result in some decomposition. In a particularly preferred embodiment between about ½ to 4 hours' reaction time is used.

In general, diluents or solvents are not required in the process but can be used to advantage for heat distribution and solvating in those instances when the bimetallic organometallic compound is a solid. The organic solvents which are essentially inert under the reaction conditions and liquid are applicable. For such purpose, the hydrocarbons, ethers and amines, particularly tertiary amines, are most suitable. Among the hydrocarbons are included both aliphatic and aromatic materials as, for example, the hexanes, octanes, nonanes, cyclohexanes, benzene, toluene, xylene, tetralin and the like. The ethers include, for example, diethyl ether, diamyl ether, dioctyl ether, methylamyl ether, diphenyl ether, dibenzyl ether, cyclic ethers, such as dioxane, tetrahyrdrofuran and the polyethers as, for example, the dimethyl, diethyl, dibutyl and the like ethers of ethylene glycol, diethylene glycol, triethylene glycol, and tetraethylene glycol. Included among the amines are the primary, secondary and tertiary amines, especially the tertiary amines which are less reactive with the bimetallic organometallic compound. Typical examples of such amines include ethyl, butyl and octyl amine; diethyl amine, dibutyl amine, dicyclohexyl amine, diphenyl amine, dibenzyl amine, triethyl amine, triphenyl amine, aniline, pyridine and isoquinoline. While many of the ethers and amines will complex with the bimetallic organometallic compound, this does not hinder their use in the reaction. The aromatic hydrocarbons, cyclic ethers, polyethers and tertiary amines comprise a preferred group of diluents to be employed because of their greater availability and easier recovery from the reaction system. The cyclic ethers and polyethers, especially tetrahydrofuran and the dimethyl, diethyl and methyl ethyl ethers of diethylene glycol, are particularly preferred because of their greater solubility for the bimetallic organometallic compounds and their reaction promoting effect.

The proportions of the reactants are not critical and are based upon the amount of metal employed in the reaction. The bimetallic organometallic compound is generally employed between about 0.5 to 10 stoichiometric equivalents per mole of the metal. The ester is generally between about 0.5 to 20 stoichiometric equivalents per mole of the metal. In an especially preferred embodiment between about 1 to 4 stoichiometric equivalents of the bimetallic organometallic compound and between about 6 to 10 stoichiometric equivalents of the ester per mole of the metal are employed to result in high yield and efficient utilization of the starting materials. If desired, about 5–100 mole excess of ester can be employed based on the bimetallic organometallic compound to insure complete utilization of the complex. Such excess is readily recoverable from the reaction system. When a diluent is employed, it is generally present in amount sufficient to provide fluidity of the reaction mixture. Generally, between about 1 part to 100 parts per part by weight of metal is employed.

The products produced according to the process of this invention are of considerable utility. For example, the tetraorganotin compounds are useful as agricultural chemicals, especially as fungicides and biocides. The organoaluminum compounds are useful in the formation of polymerization catalysts for polymerizing olefins. The organozinc, magnesium, beryllium and the like compounds including also the tin and aluminum compounds are useful in the preparation of other organometallic compounds by reaction of particular metals therewith. Likewise such organometallic compounds can be employed to deposit films of the metals upon another metal by vaporizatoin decomposition techniques. These and other uses of the products of this invention will be evident.

Having thus described the process of this invention, it is not intended that it be limited except as set forth in the following claims.

I claim:

1. A process for the manufacture of tetraethyltin which comprises reacting sodium tetraethylaluminum with finely divided tin and ethyl chloride at between about 25 to 150° C.

2. A process for the manufacture of organometallic compounds which comprises reacting a polyvalent metal having an atomic number of less than 82 and capable of forming a stable organometallic compound, with an organic ester of an inorganic acid capable of contributing an organic radical wherein a carbon atom will bond to said polyvalent metal, and a bimetallic organometallic compound wherein one metal of said bimetallic compound is selected from the group consisting of group I–A and group II–A metals and the other metal is selected from the group II–B and III–A metals, and having at least one carbon to metal bond with the remaining valences satisfied by constituents selected from the group consisting of ligands which are essentially inert in the reaction and organic radicals, the polyvalent metal being different than the metals of the bimetallic compound.

3. A process for the simultaneous preparation of organometallic compounds of two different metals which comprises reacting a fully alkylated complex compound consisting of an alkali metal boron tetraalkyl, the alkyl groups thereof each having up to about 6 carbon atoms, with a hydrocarbon halide having up to about 18 carbon atoms in the hydrocarbon group and a polyvalent metal different from the metals of the complex compound and having an atomic number below 82, at a temperature between about 25 to 150° C.

4. A process for the simultaneous preparation of organometallic compounds of two different metals which comprises reacting a fully alkylated complex compound consisting of an alkali metal aluminum tetraalkyl, the alkyl groups thereof each having up to about 6 carbon atoms, with a hydrocarbon halide having up to about 18 carbon atoms in the hydrocarbon group and a polyvalent metal different from the metals of the complex compound and having an atomic number below 82, at a temperature between about 25 to 150° C.

5. The process of claim 2 wherein said polyvalent metal is finely divided, said organic ester is a hydrocarbon halide having up to about 18 carbon atoms in the hydrocarbon group, and said bimetallic organometallic compound is a sodium aluminum tetraalkyl, the alkyl groups thereof each having up to about 6 carbon atoms, said polyvalent metal being different than the metals of the sodium aluminum tetraalkyl, and said reaction being conducted at a temperature between about 25 to 150° C.

6. The process of claim 2 wherein said polyvalent metal is finely divided, said organic ester is a hydrocarbon halide having up to about 18 carbon atoms in the hydrocarbon group, and said bimetallic organometallic compound is a sodium boron tetraalkyl, the alkyl groups thereof each having up to about 6 carbon atoms, said polyvalent metal being different than the metals of the sodium boron tetraalkyl, and said reaction being conducted at a temperature between about 25 to 150° C.

References Cited in the file of this patent

UNITED STATES PATENTS

| | | |
|---|---|---|
| 2,863,894 | Smith | Dec. 9, 1958 |
| 2,958,703 | Nowlin et al. | Nov. 1, 1960 |

FOREIGN PATENTS

| | | |
|---|---|---|
| 793,354 | Great Britain | Apr. 16, 1958 |
| 548,439 | Belgium | Dec. 7, 1956 |

OTHER REFERENCES

Bennett: "Concise Chemical and Technical Dictionary," Chemical Publishing Co., Inc., Brooklyn, New York (1947), pages 600 and 601 relied on.